G. H. CHATILLON.
SPRING-SCALE.
No. 171,993.  Patented Jan. 11, 1876.
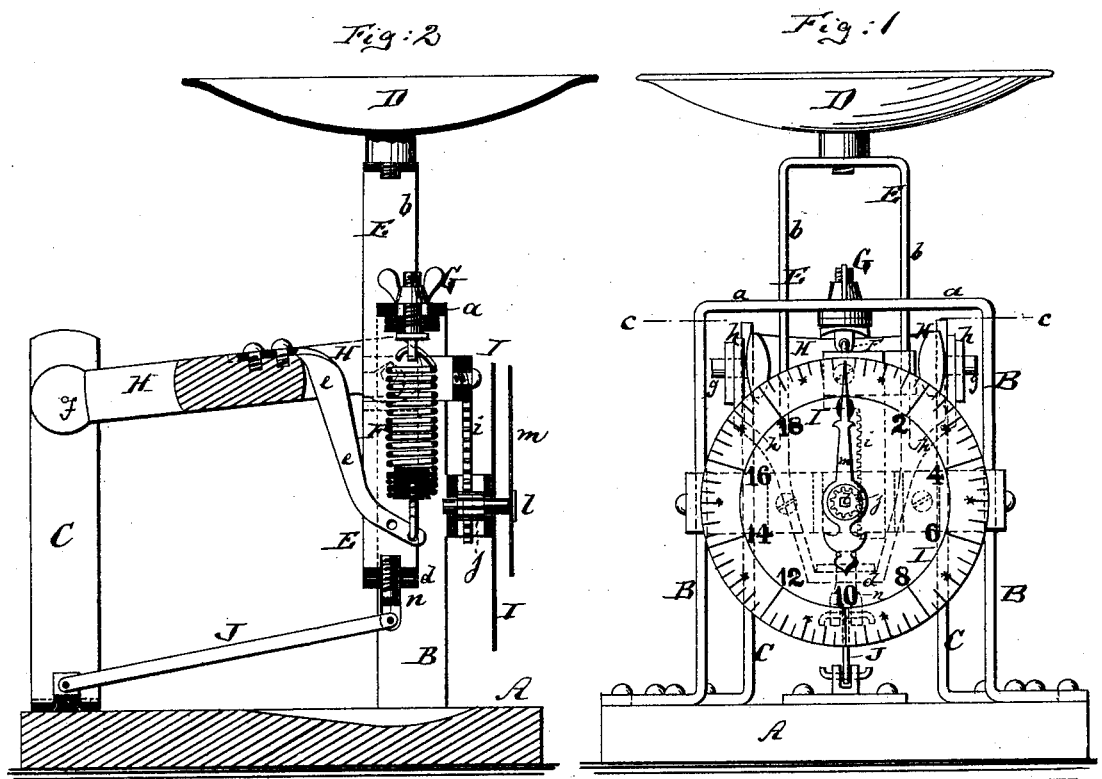
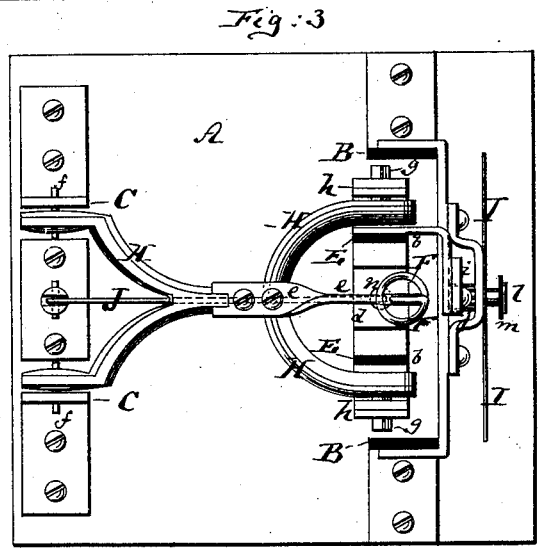
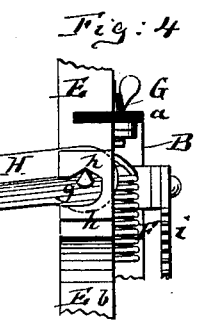
Witnesses:
A. Moraga
F. v. Briesen
Inventor
George H. Chatillon
by his attorney
A. v. Briesen

UNITED STATES PATENT OFFICE.

GEORGE H. CHATILLON, OF NEW YORK, N. Y., ASSIGNOR TO JOHN CHATILLON & SONS, OF SAME PLACE.

IMPROVEMENT IN SPRING-SCALES.

Specification forming part of Letters Patent No. 171,993, dated January 11, 1876; application filed October 28, 1875.

*To all whom it may concern:*

Be it known that I, GEORGE H. CHATILLON, of the city of New York, county and State of New York, have invented an Improved Spring-Balance, of which the following is a specification:

Figure 1 is a front view, Fig. 2 a vertical longitudinal section, Fig. 3 a horizontal section, of my improved spring-balance, taken on the plane of the line $c\ c$, Fig. 1. Fig. 4 is a detail side view of the knife-edge support.

Similar letters of reference indicate corresponding parts in all the figures.

My invention consists, principally, in the novel combination of a forked lever and accompanying devices with the shank or lower frame of the pan and the balance-spring, in such a manner that the pan will be able to vibrate on its supports without interfering with the position of the spring.

The invention also consists in further details of improvement, as hereinafter more fully specified.

In the accompanying drawing, the letter A represents the base of my improved spring-balance. B B are the front standards, firmly attached to the base A, and connected at their upper ends by a cross-bar $a$, as shown in Fig. 1. C C are two parallel rear standards, firmly attached to the base A, as shown in Figs. 2 and 3. D is the scale-pan, swiveled or otherwise secured upon a shank or frame, E, which is slotted, being principally composed of two parallel vertical bars, $b\ b$, which are joined at their lower ends, as shown at $d$, with sufficient space between them to allow said frame E to straddle the balance-spring F. This spring F is, at its upper end, secured to a screw, G, which has its support in the cross-bar $a$, while the lower end of the spring F connects with the arm $e$ of a lever, H, as shown in Fig. 2. The rear end of the lever H is forked, as in Fig. 3, and pivoted by pins $f f$ to the uprights C. The front end of the lever H is also forked or horseshoe-shaped, as shown in Fig. 3, to straddle the frame E, and has, transversely in line with said frame, projecting knife-edge lugs $g\ g$ that extend through hook-shaped ears $h\ h$, which project from the sides of the frame or shank E, as shown in Fig. 4. The arm $e$ of the lever H projects downward into the slot of the frame E, near to the lower part thereof, as shown in Fig. 2. One of the arms $b$ of the frame E carries a vertical rack, $i$, that gears into the pinion $j$, which is mounted upon the arbor $l$ of the revolving pointer $m$, said pointer traveling in front of the dial-plate I in the customary manner. The lower end of the arm or shank E receives a screw, $n$, to the lower end of which is pivoted the brace J, connecting said frame E with the base A.

This brace J is old, and commonly used in scales; but I consider the screw-connection $n$ an important feature of my invention, as it enables me to adjust the position of the brace J in the requisite manner to the individual strength and tension of each spring F, while heretofore such adjustment was not possible, except by hammering and disfiguring the front connection of the brace J.

It will be observed that by interposing the pivoted frame H between the spring F and the pan-frame E I allow to the latter a degree of individual play which it does not possess when the spring is directly connected to frame or shank of the pan, as it is in most other spring-balances, for my pan is capable of tilting forward and backward on its knife-edge supports $g\ g$, in case the weight is placed forward or back of the center of the pan, and is also capable of receiving the weight more at one side or the other of the center, without, thereby, straining or bending the spring F, as said spring is only affected by the motion of the frame H, which motion cannot possibly be otherwise than a vertical vibration on its pivots $f$.

When, as in most other spring-scales, the spring is directly connected to the shank of the pan, the scale will register differently if the weight is put forward of the center of the pan than it will if the weight is put backward of the center of the pan, or in the center; but in my scale the registration will invariably be alike, as the lever H will, in its downward movement, be only affected by the dead-weight upon the pan, no matter where such weight is placed, with reference to the center of the pan.

I claim as my invention—

1. The combination of the bifurcated lever H, which has the projecting arm *e* within the fork, with the pivot *f* in the post C, and with the slotted frame E, spring F, and stationary frame B, to operate substantially as specified, 2. The screw *n*, combined with the shank or frame E of the scale-pan, and with the brace J, substantially in the manner described.

GEO. H. CHATILLON.

Witnesses:
F. V. BRIESEN,
JOHN P. CHATILLON.